May 29, 1956  SUNAO SHIBATA  2,747,353
AUTOMATIC PACKING APPARATUS FOR GLASS SHEETS
Filed Jan. 5, 1953  4 Sheets-Sheet 1

INVENTOR.
Sunao Shibata
BY
ATTORNEYS

May 29, 1956 SUNAO SHIBATA 2,747,353
AUTOMATIC PACKING APPARATUS FOR GLASS SHEETS
Filed Jan. 5, 1953 4 Sheets-Sheet 2

INVENTOR.
Sunao Shibata
BY
ATTORNEYS

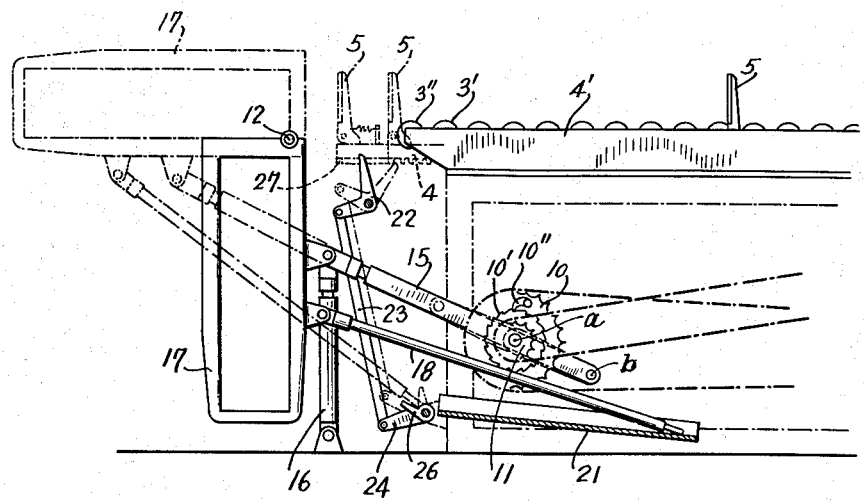
FIG.5.
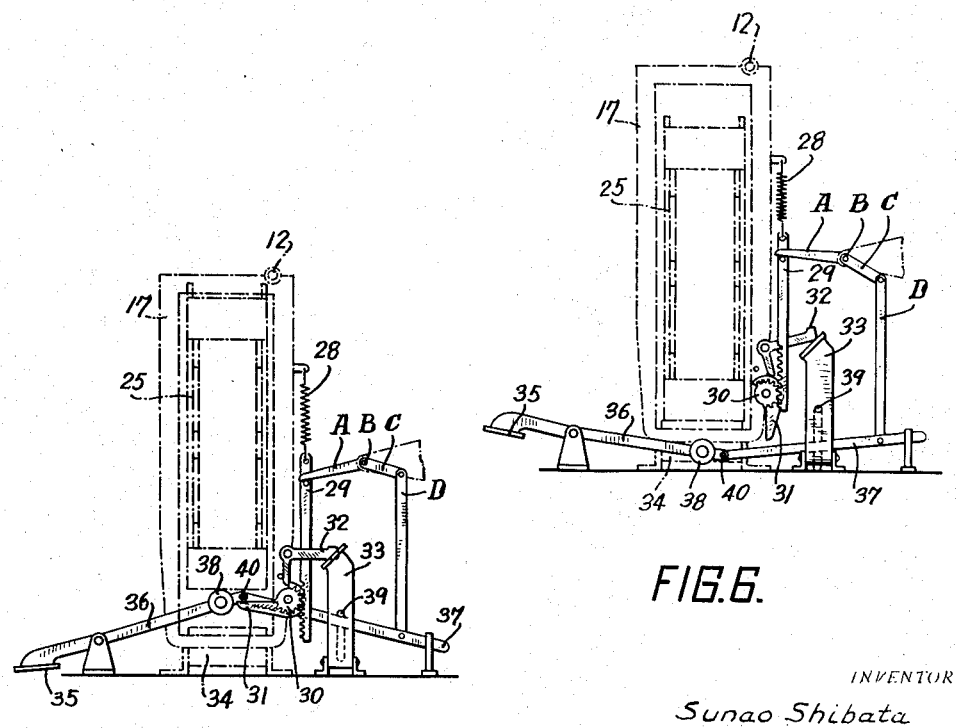
FIG.6.
FIG.7.

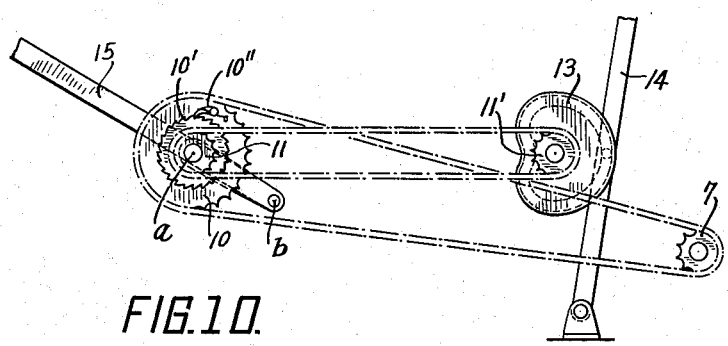
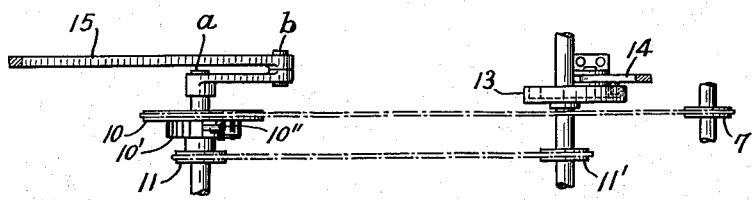
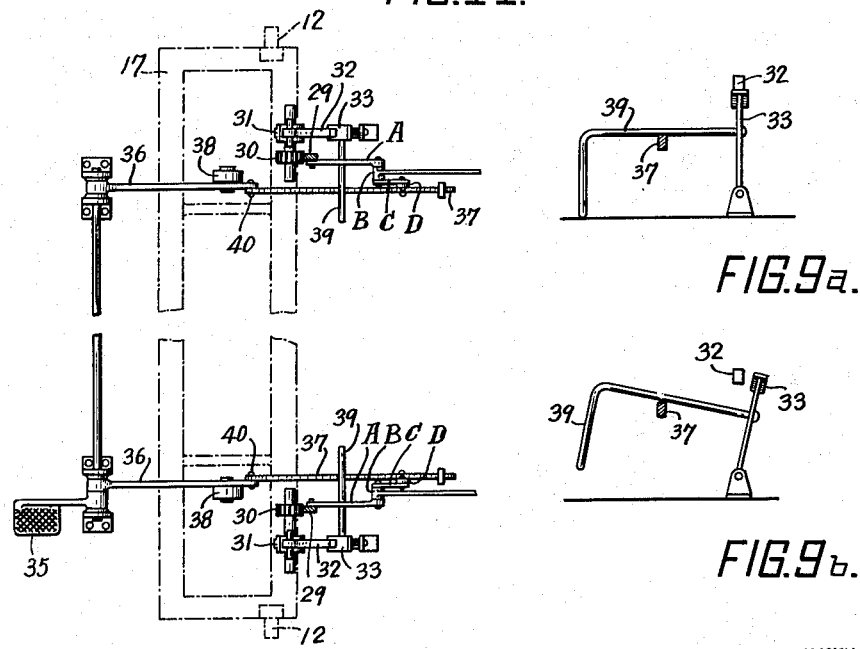

United States Patent Office 2,747,353
Patented May 29, 1956

2,747,353

AUTOMATIC PACKING APPARATUS FOR GLASS SHEETS

Sunao Shibata, Yokohama City, Kanagawa-ken, Japan, assignor to Asahi Garasu, Kabushiki Kaisha, Tokyo, Japan, a corporation of Japan Application January 5, 1953, Serial No. 329,545

8 Claims. (Cl. 53—249)

The present invention relates to an automatic packing apparatus for glass sheets.

This invention has for an object an improved automatic packing apparatus for glass sheets, wherein the glass sheets are automatically fed into a crate wrapped in packing materials.

Another object of the present invention is to dispense with the operator's heavy labor usually needed in such an operation of packing and to save a considerable amount of the working space, in performing the required glass sheet packing automatically with an utmost exactitude at high speed.

A further object of the present invention is to enhance the efficiency of the packing operation for glass sheets by feeding the glass sheets into a crate with utmost exactitude and high speed automatically.

Further objects, characteristics and advantages of the present invention will be apparent from the following detailed description in respect to the illustrative embodiment of the invention.

In the present invention, the provision of an extremely useful and efficient new automatic packing apparatus for glass sheets is provided by a combination of a glass sheet feeding device, a horizontal supporting device for a holding frame to hold a crate in which glass sheets are to be contained and a device for lifting crates within the holding frame.

According to the invention, glass sheets previously cut in suitable sizes are successively transported over a rollgang, they are piled up on the roller frame in any suitable quantity with an extreme exactitude; then they are forwarded on the rollers a definite distance, after which the glass sheets are fed into a crate in the holding frame which is horizontally positioned at the front of the conveyor and arranged with packing materials such as wood wool, straw, corrugated board paper and the like. Subsequently, the crate is returned to a vertical position with the holding frame, and the crate pushed out of the holding frame, packing material such as wood wool, straw, corrugated board paper and the like are placed on the open top of the crate and the cover is put thereupon to complete the packing operation. Thus, an integral operation from the feeding to the packing of glass sheets is achieved.

In order that the invention may be more clearly understood, one embodiment thereof will now be described by way of example and will reference to the accompanying drawings, wherein:

Fig. 5 is a side view of the supporting device for the crate holding frame actuated in conjugation with the transfer movement of a transporter;

Fig. 6 is a side view of a means for lifting the crate, when the crate is in the holding frame;

Fig. 7 shows an illustration for the action thereof;

Fig. 8 is a plan view of the crate lifting device as shown in Fig. 6;

Fig. 9($a$) is a diagrammatical representation of the relationship between the crate lifting lever and the pawl disconnecting plate in normal condition;

Fig. 9($b$) is the diagrammatical showing of an action of the pawl disconnecting plate to be brought down by the lever.

Fig. 10 is a side view illustrating gearing for lifting the crate holding frame, cam gearing for forwarding the roller frame of the conveyor, and an operational relation between the main transmission gear and ratchet gearing and Fig. 11 a plan view thereof.

Figure 1:
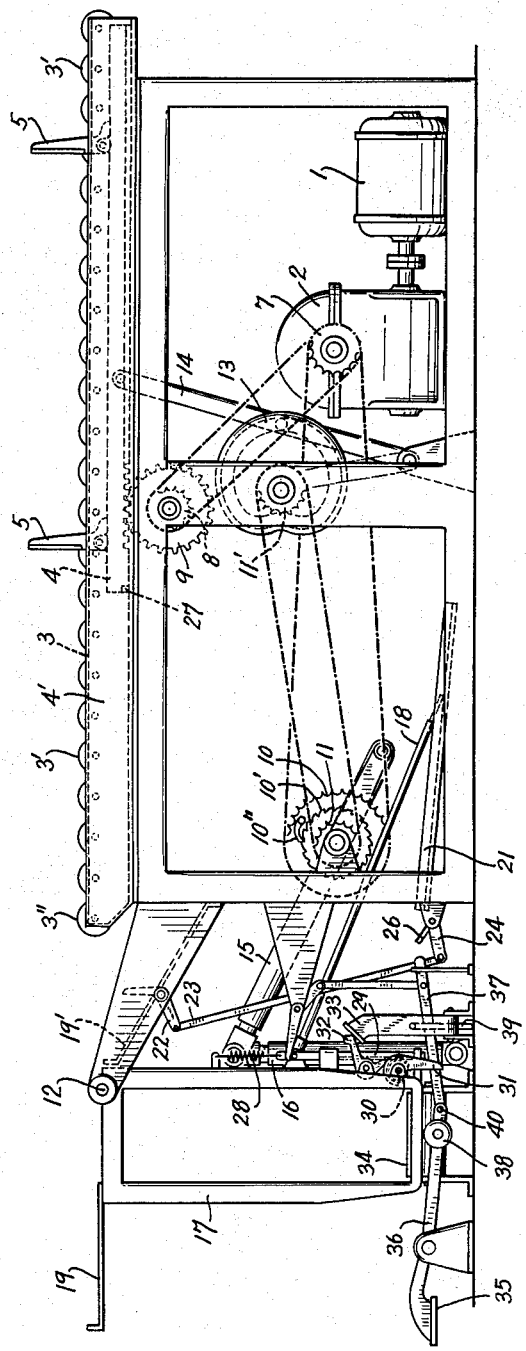
Fig. 1 is a side view showing the principal parts of an automatic packing device for glass sheets according to the present invention.
Figure 2:
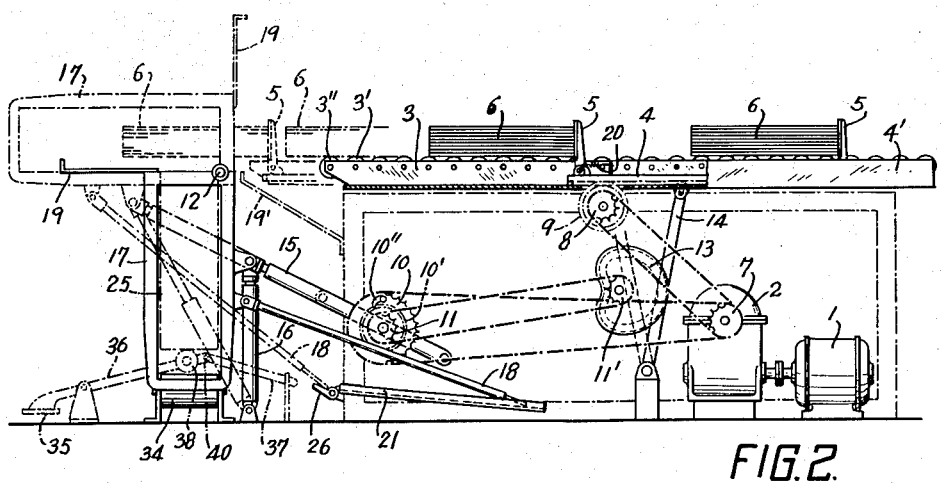
Fig. 2 is a side view showing the relation between the crate holding frame and conveyor for feeding glass sheets.
Figure 3:
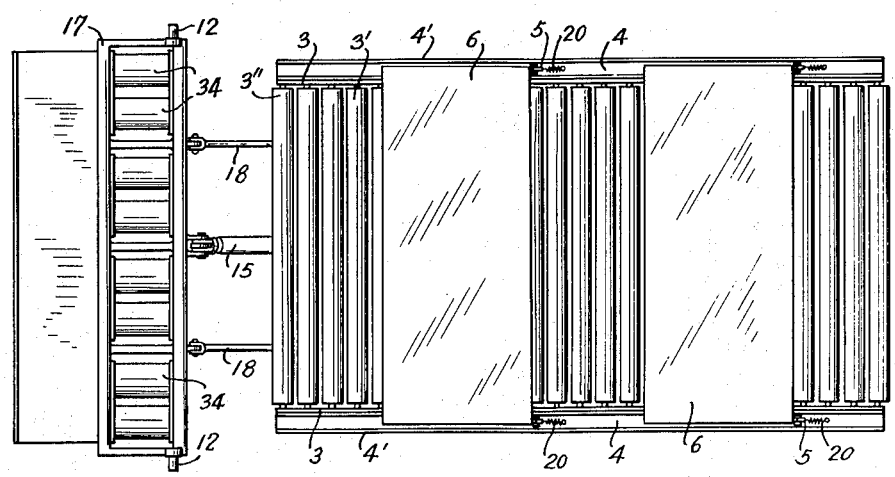
Figure 3 is a plan view thereof.
Figure 4:
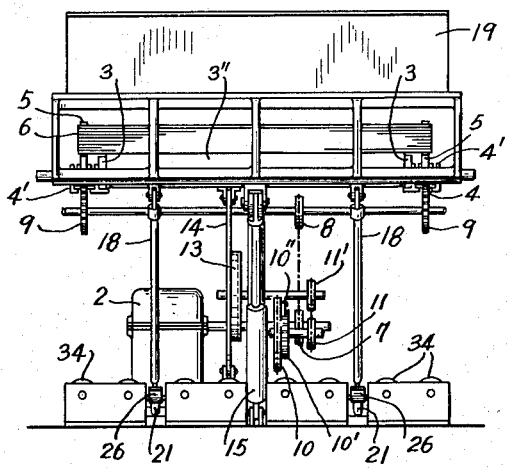
Fig. 4 is a front view thereof.

Referring to Figs. 1 to 4, on a roller conveyor travelling automatically and intermittently, consisting of a number of rollers 3' arranged in parallel on a frame 3 are piled up any desirable quantity of glass sheets. Two racks 4 provided respectively on the lower sides of frames 4' arranged on the side of roller frames 3 on both sides of said conveyor provide for forward movement of said frame by being brought into engagement with pinions 9 secured coaxially to the chain wheel 8 actuated through the main transmission chain wheel 7 of a reduction gear 2 of a geared motor 1 and the chain. With the advance movement of the roller frame, and consequently the roller conveyor, a pair of pawls 5 operates for feeding glass sheets vertically attached to the upper face of the racks 4 keeping adequate spacing from one another, and constructed so as not fall back but capable of falling forward and retained by spring 20. Therefore, in order to maintain the horizontal position of glass sheets till they have entered the crate the roller frame is advanced a definite distance (to the position partially shown with dotted lines in Fig. 2) by the engagement between a feed cam 13 for the roller frame and a cam lever 14, while the cam 13 turns a half rotation to feed the glass sheets for a small distance into a crate horizontally positioned. And in the subsequent half turn of the cam 13, the roller frame moves backwards to its original position. Further in its return movement, the feed pawls 5 continue to advance the glass sheets 6 completely into the crate.

The cam for roller frame 13, having a transmission chain wheel 11', cooperates with a transmission chain wheel 10 of a lifting crank 15 ($a$ and $b$ are crank arms) for the crate holding frame 17 or the holding frame for crate engaging with the main transmission chain wheel 7 and a chain wheel 11 for cam-gearing by means of a chain belt.

Of the operations described before, the roller feeding and the lifting operation are all worked by means of ratchet 10' actuated by engagement with the pawls 10" provided on one side of the transmission chain wheel 10 as illustrated in Figs. 10 and 11.

In consequence, in the reverse rotation of the electric motor initiated by a change-over switch for the circuit, the main transmission chain wheel 7 is disengaged by the ratchet 10' and it disconnects all the gearings excepting the return movement of the rack 4 of feed pawls 5.

The crate holding frame 17 consists of a U-shaped frame with both side-walls and the upper surface being opened. In front of the upper surface perpendicular thereto is provided a packing material receiving plate 19, and with a packing material receiving plate 19'.

The crate 25 is pushed through the U-shaped opening in a front wall of the crate holding frame, after which the case is vertically raised in the frame by means of pedal 35 of the crate lifting device as described later, approximately to the upper level of the holding frame.

In the next place, said holding frame 17 with straw and the like packing material is rotated about axis 12 as a fulcrum by the engagement of said holding frame lifting connector 15 consisting of a sliding rod and sleeve. Into the crate holding frame held horizontally by the supporting device described later, glass sheets are pushed, while being wrapped in the packing material. Further, on the return movement of the feed pawl 5, the crate holding frame being released from its horizontal position returns to the original vertical position.

Referring to Fig. 5, the supporting device for the crate holding frame is actuated in conjunction with the starting device for the conveyor. To the center of the lower surface of crate holding frame 17, a front end of the connector 15 and an axle-head of an oil pressure pump 16 are pivotally secured. Both front ends of supporting rods 18 of aforesaid holding frame 17 are pivotally secured to the right and left portions of the lower surface of said crate holding frame 17 respectively. In the lower portion of the conveyor body, guide members 21 are provided which serve as guides for the end portions of the supporting rods 18. The holding mechanism for the crate holding frame comprises of an L-shaped lever 22 disposed so it can swing at the front end of said conveyor body, a long and a short rod 23 and 24 engaging therewith, a hook piece 26 for supporting rod 18, and a disconnecting mechanism for the supporting rod. Moreover, the connector 15 is motivated, concurrently with the starting of the conveyor, by connecting the transmission chain wheel 10 secured thereto and the main transmission chain wheel 7 of the conveyor with a belt chain as described above. When the crank transmission chain wheel 10 has completed a half revolution, the crate holding frame 17 turns about shaft 12 to a horizontal position.

The lower end of supporting rod 18 slides on the guide 21 upon rotation of the crate holding frame 17. It is halted by the hook piece 26 as soon as the holding frame is about to reach the horizontal position. Whereupon the crank transmission chain wheel 10 will turn another half round to reach the starting position and stop, while the holding frame is held horizontally as the rod of the connector 15 slides in the sleeve.

Feed pawls 5 on the feeding device move glass sheets into the crate. On the transition to the backward movement, an engaging piece 27 provided in the lower portion of said pawls on the rack frame 4' pushes a head portion of one arm of the L-shaped lever 22 down. Consequently, the other arm of said lever is pushed upwards, and by the engagement of said long and short bars 23 and 24, the hook piece 26 of the supporting rod turns freeing the lower end of the horizontally supporting rod 18 from dog 26. The horizontal bar slides on the guide member 21, and the crate holding frame 17 having been horizontal turns 90 degrees to the original vertical position. In this case, the speed of aforementioned vertical return motion of the crate can be regulated suitably by an oil pressure pump 16 secured to the holding frame.

Next, a device for lifting the crate within the holding frame consists of a rack 29 connected with one end of a spring 28 with the other end secured onto the lower surface of the crate holding frame arranged at the front end of the glass sheets conveyor suitably spaced therefrom, a crate supporting pawl 31 having pinions 30 engaged with said rack and a pawl retaining piece 32 engaged thereto, a pawl disconnecting plate 33 as well as a series of link bars A, B, C, D in engagement therewith, and of a lever mechanism for lifting crate and so forth, as shown in Figs. 6 and 9.

When the crate holding frame 17 is placed vertically, the top level of rollers 34 provided on the floor surface, is adapted to lie a little higher than the inside bottom surface of said holding frame.

*Operation*

First, an empty crate 25 is pushed along rollers 34 into the frame 17 through a front opening. Then, when a pedal is treaded down, the crate 25 is raised upwardly by a roll 38 fastened to the lever 36 connected to lever 37 at 40. The opening of the case is raised in this way nearly to the same level as that of the opening of crate holding frame 17, and simultaneously lever 37 brings the pawl disconnecting plate 33 down laterally by lifting the L-shaped rod 39 secured to the side wall of said disconnecting plate 33, which is so arranged, as shown in Figs. 6 and 9, that its lower end is pivoted to the supporting piece above the floor and is held upright by the rod 39. In this case, one end of the pawl retaining piece 32, engaging with the crate supporting pawl 31, is raised by the top surface of said plate 33. And under such a condition, the rack 29 is lifted up by the action of the spring 28. The crate supporting pawl 31 secured coaxially with the pinion 30 engaging with the rack hangs by the side of the crate with some space therefrom. But if the pedal 35 is treaded on, the levers 36 and 37 will be raised as shown in Figure 7, the pawl disconnecting plate 33 will be pushed upwards against rod 39 with the lever 37 and then the plate 33 will move down. At the same time, the lower-most lever D of link levers secured to said lever will be pushed up, and thereby the front end portion of the uppermost lever A pushes the rack 29 down against the spring 28, through levers C, D and then sets in the rotation the pinions 30 engaging with the rack 29. Simultaneously, the front end of the crate supporting pawl 31 coaxial with said pinion is raised while rotating in the crate holding frame, and engaged in the recess provided in a spindle for said pawl 31, with the pawl retaining piece 32. Thereby the crate may be held in raised position in the crate holding frame.

Now, when the pedal 35 is released, the levers 36 and 37 will descend to their original position with the pedal. When this condition is reached, the pawl disconnecting plate 33 will tend to return automatically to the original vertical position spontaneously, by the action of the L-shaped rod 39 as a weight. However, the said plate 33 still lies down by the side of the pawl retaining piece 32 as shown in Figure 7 till the contact with the pawl connecting piece 32 is removed by the rotation of the crate holding frame.

As described heretofore, the glass sheets as pushed into the crate to a suitable position in packing material such as, straw and the like, then the rack 4 stops for a moment by the action of a limit switch, the electric circuit is changed over, the feed pawls 5 on being drawn back will be brought down by passing below the lower surface of the glass sheets to be fed next, without giving damage to the glass sheets and will be raised again by the spring 20 after they have passed under the piled glass sheets.

And as soon as the return movement of racks is started, the end of the rod 18 for horizontally supporting the crate holding frame is made to fall down by the rotation of hook piece 26, said holding frame 17 turning round the rotation axis 12 as a turning axis and being about to reach a vertical position, when the one end of the pawl retaining piece 32 bumps with the top surface of the pawl disconnecting plate 33, thereby the engagement of pawl retaining piece and crate supporting pawl is released, the pinion 30 is turned by a spring to disengage the crate supporting pawl 31, the crate falls down on the crate feeding rollers 34 within the holding frame, and by virtue of the shock, the glass sheets are wrapped up more exactly with the packing material such as straw and the like. Then the crate containing the glass sheets thus wrapped with packing materials is brought out of the holding frame, a pillow of straw and the like is then placed on its top surface and clad with a cover plate thereupon to complete the packing operation.

In the aforesaid embodiment of the invention, a rack is employed for transmitting glass sheets, and the rack is moved back and forth by an electric motor used as a power source. It is also possible that the glass sheets be transferred by using worm gears or endless conveyor or the like, only for the forward movement, or two electric motors are used, one for the transmitting of glass sheets and another for horizontally supporting the crate holding frame, or other suitable mechanisms are employed for this purpose.

The foregoing descriptions have been made in reference to one preferred embodiment of the present invention. It is, however, to be understood that various other modifications of the construction and arrangement of various parts may be made without departing from the spirit and scope of the present invention, if desired.

What I claim is:

1. An automatic glass sheet packing apparatus comprising: a runway; an intermittent feeding means for feeding sheets of glass along said runway; a crate holding device at one end of said runway; means for turning said crate holding device from a vertical to a horizontal position; and lifting means within said device for lifting a crate positioned therein.

2. An automatic glass sheet packing apparatus comprising: a roller conveyor; an intermittent feeding mechanism at the side of said conveyor for engaging sheets of glass on said conveyor and feeding them therealong; a crate holding device at one end of said conveyor; means for turning said crate holding device from a vertical to a horizontal position; and lifting means within said device for lifting a crate positioned therein.

3. An automatic glass sheet packing apparatus comprising: a runway; power driven members supported at the sides of said runway and having dogs extending above the plane of said runway adapted to engage sheets of glass and feed them along said runway; a crate holding device pivoted at one end of said runway; means for turning said device through 90°; and lifting means within said device for lifting a crate positioned therein.

4. An automatic glass sheet packing apparatus comprising a runway; power driven members supported at the sides of said runway; racks on said members; pinions engaging said racks for motivating said members; dogs pivoted on said members; springs biasing said dogs into a position approximately perpendicular to the plane of said runway whereby articles on said runway are pushed in one direction therealong when said member is motivated; and a crate holding device at one end of said runway for receiving the sheets fed therealong.

5. An automatic glass sheet packing apparatus comprising: a roller frame; rolls mounted to rotate in said frame; members slideably supported at the sides of said frame; racks on the lower portion of said members; pinions engaging said racks to motivate said members; dogs pivoted to the upper portion of said members, adapted to pivot through 90°; springs biasing said dogs into an article engaging position above the plane of said rolls; and means for rotating said pinion to move said member and dogs along the roller frame.

6. An automatic glass sheet packing apparatus comprising: a runway along which piles of glass sheets may be fed; a normally vertical crate holder pivotally mounted at the end of said runway; lifting means for raising said holder to a horizontal position; supporting means for maintaining said holder in said horizontal position; and means for raising a crate within said holder.

7. An automatic glass sheet packing apparatus comprising: a runway along which piles of glass sheets may be fed; a normally vertical crate holder pivotally mounted at the end of said runway having side openings for the reception and discharge of crates and a top opening whereby said crates may be filled; a power driven connecting rod serving to raise said holder to a horizontal position; leg members pivoted to said holder at one end and adapted to support said holder in a horizontal position; a roller pivotally supported at the bottom of said holder; a lever pivoted to said roller and adapted to raise same in said holder; and a treadle for actuating said lever to raise said roller.

8. An automatic glass sheet packing apparatus comprising: a roller frame; rolls mounted to rotate in said frame; members slideably supported at the sides of said frame; racks on the lower portion of said members; pinions engaging said racks to motivate said members; dogs pivoted to the upper portion of said members, adapted to pivot through 90°; springs biasing said dogs into an article engaging position above the plane of said rolls; power means for rotating said pinion to move said member and dogs along the roller frame; a normally vertical crate holder pivotally mounted at the end of said runway having side openings for the reception and discharge of crates and a top opening whereby said crates may be filled; a power driven connecting rod coupled at one end to said holder and at its other end to a crank arm rotated by said means for rotating said pinion; leg members pivoted to said holder at one end and adapted to support said holder in a horizontal position; a roller pivotally supported at the bottom of said holder; a lever pivoted to said roller and adapted to raise same in said holder; and a treadle for actuating said lever to raise said roller.

References Cited in the file of this patent

UNITED STATES PATENTS

| | | |
|---|---|---|
| 133,173 | Penick | Nov. 19, 1872 |
| 2,469,229 | Gould | May 3, 1949 |
| 2,613,021 | Bowers | Oct. 7, 1952 |
| 2,633,280 | Davies | Mar. 31, 1953 |